Dec. 23, 1969   D. L. WATROUS   3,486,042
ZERO CROSSING SYNCHRONOUS SWITCHING CIRCUITS FOR POWER
SEMICONDUCTORS SUPPLYING NON-UNITY POWER FACTOR LOADS
Filed Oct. 6, 1966   5 Sheets-Sheet 1

Inventor:
Donald L. Watrous,
by Paul G. Frank
His Attorney.

Inventor:
Donald L. Watrous,
by Paul A. Frank
His Attorney.

Inventor:
Donald L. Watrous,
by Paul A. Frank
His Attorney.

Inventor:
Donald L. Watrous,
by Paul A. Frank
His Attorney.

Dec. 23, 1969     D. L. WATROUS     3,486,042
ZERO CROSSING SYNCHRONOUS SWITCHING CIRCUITS FOR POWER
SEMICONDUCTORS SUPPLYING NON-UNITY POWER FACTOR LOADS
Filed Oct. 6, 1966     5 Sheets-Sheet 5

Fig. 8.

*Inventor:*
*Donald L. Watrous,*
*by Paul A. Frank*
*His Attorney.*

United States Patent Office 3,486,042
Patented Dec. 23, 1969

3,486,042
ZERO CROSSING SYNCHRONOUS SWITCHING
CIRCUITS FOR POWER SEMICONDUCTORS
SUPPLYING NON-UNITY POWER FACTOR
LOADS
Donald L. Watrous, Scotia, N.Y., assignor to General
Electric Company, a corporation of New York
Filed Oct. 6, 1966, Ser. No. 584,702
Int. Cl. H03k 17/02
U.S. Cl. 307—252                                    26 Claims

ABSTRACT OF THE DISCLOSURE

A synchronous control circuit preferably fabricated in integrated circuit form is used in power circuits supplying either non-unity or unity power factor loads including an electric motor. The control circuit applies gating signals to a gate controlled power semiconductor such as a triac thyristor at each current zero crossing interval of the alternating current source, unless inhibited by a sensor responsive to temperature or the like. The buildup in potential across the power semiconductor is sensed when it blocks during the current zero interval, and a turn-on signal is generated and applied to gating switch means coupled with rectifier means for providing a continuous low voltage gating potential. Control means in the form of one or more differential amplifiers, each connected in a resistance bridge including a thermistor sensor, actuates shunt means for selectively shunting the turn-on signal and gating means.

---

This invention relates to new and improved zero crossing synchronous switching power circuits and to improved synchronously operable controls for such circuits.

More particularly, the invention relates to a control circuit for controlling gate controlled power semiconductors to supply non-unity power factor loads from a source of alternating current supply potential, the power semiconductors being actuable to conduct current synchronously with the zero crossings of the supply alternating current.

Zero crossing synchronous switching of power circuits supplied from alternating current or full wave rectified power sources has at this time become accepted as the most feasible approach to the use of power semiconductors for controlling power supplied to home appliances or other apparatus where radio frequency interference becomes a problem. Zero crossing synchronous switching requires that current through a load be established or interrupted as the alternating current or full wave rectified current passes through the zero value region. Switching under these conditions reduces radio frequency interference effects to a minimum and eliminates the need for substantial filter circuits. Hence, switching circuits utilizing this concept are far less expensive, smaller in size and operate more reliably and efficiently than circuits employing other control techniques.

The interruption of current flow through a power semiconductor during the current zero crossing of an applied alternating current of full wave rectified supply potential presents no problems since the device naturally turns off if the current through it drops below a known minimum holding value. Turn-on of a power semiconductor during the zero crossing interval, however, requires that the turn-on control circuit have the capability of sensing the zero current crossing interval, and then turn on the power semiconductor only during this interval. Such turn-on circuits for use with unity power factor loads are known in the art and have been described in the literature. For example, see the article entitled, "RFI-less Switching With SCR's" by F. W. Gutzwiller, appearing in the EEE magazine (the magazine of circuit design), March, 1964, issue.

The present invention relates to new and improved zero crossing synchronous switching power circuits for use with either unity power factor or non-unity power factor loads and which preferably employ power semiconductor gate controlled conducting devices which are bidirectional conducting in their characteristics.

The invention also relates to new and improved low voltage (signal level) synchronously operably control circuits for use in controlling either unity power factor or non-unity power factor power circuits and which are amenable to manufacture in integrated circuit form. As a result the control circuits have a cost advantage, decreased size and improved reliability.

The provision of zero crossing synchronous switching power circuits for controlling circuits having a unity power factor is a relatively straight forward problem due to the fact that the voltage and current through the load are substantially in phase. However, with non-unity power factor loads, the current through the load either leads or lags the voltage by some phase angle determined by the nature of the load. With such loads, it is therefore desirable that the zero crossing synchronous switching power circuits controlling the non-unity power factor loads be provided with some additional means for sensing the current zero through the load, and for controlling the circuit accordingly.

It is therefore a primary object of the present invention to provide new and improved zero crossing synchronous switching circuits for either unity power factor or non-unity power factor loads.

Another object of the invention is the provision of new and improved zero crossing synchronously operable control circuits for use with such power circuits supplying either unity power factor or non-unity power factor loads and which are amenable to manufacture in integrated circuit form for the reasons of cost advantage, small size, and improved reliability.

In practicing the invention a power control circuit is provided which includes at least one power semiconductor load current carrying gate controlled conducting device and a non-unity power factor load connected in series circuit relationship across a pair of power supply terminals. Synchronously operable control circuit means are coupled to and control the gate control conducting device. The synchronously operable control circuit means comprises means for providing a continuous low voltage gating potential, and gating means operatively coupled to the means for providing the gating potential and operatively coupled to the controlled gate of the load current carrying gate control conducting device for applying a gating on signal to the device to cause the same to conduct load current therethrough. Sensing and turn on signal producing means are operatively coupled to the load current carrying gate controlled conducting device and to the gating means for sensing a build up in potential across the gate controlled conducting device and supplying a turn on signal to the gating means. Shunt means are operably coupled to the gating means for shunting the gating means, and control means are operatively coupled to the shunt means for controlling operation of the shunt means.

A further feature of the invention is the provision of synchronously operable control circuit means for controlling the operation of a gate controlled conducting device synchronously with the zero crossings of an alternating current supply potential supplying either a unity power factor or non-unity power factor load. This synchronously operable control circuit means is susceptible to fabrication by integrated circuit manufacturing techniques, and is comprised by means for providing a continuous low voltage signal level gating potential. Gating means are operatively coupled to the means providing the low voltage gating potential and are adapted to be operatively coupled to the control gate of a gate controlled conducting device for applying a gating on signal to the device to cause the same to conduct load current therethrough. Sensing and turn on signal producing means are adapted to be coupled to the gate control conducting device and are operatively coupled to the gating means for sensing build up in potential across the gate control conducting device and supplying a turn on signal to the gating means. Shunt means are operatively coupled to the gating means for shunting the gating means, and control means are operatively coupled to the shunt means for controlling operation of the shunt means.

Objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 7:
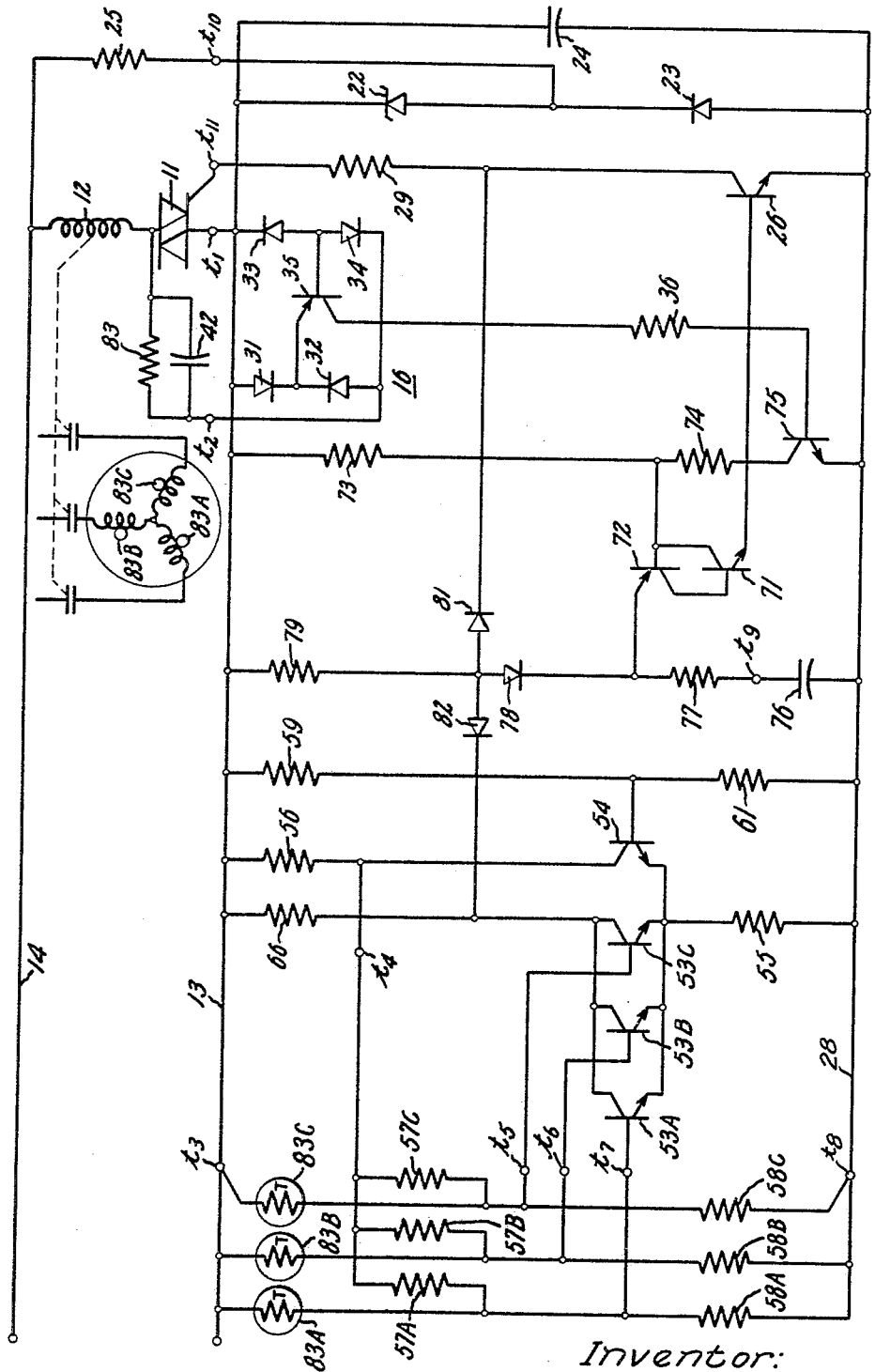

FIGURE 7 is a detailed schematic circuit diagram of a preferred form of zero crossing synchronous switching power circuit for use with non-unity factor loads; and FIGURE 8 is detailed schematic circuit diagram of the synchronously operable control circuit portion of the control circuit shown in FIGURE 7, and illustrates those portions of the control circuits which are susceptible to manufacture in integrated circuit form.

Figure 1:
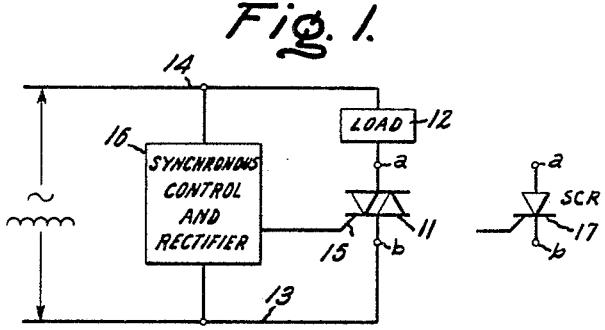
FIGURE 1 is a functional block diagram of a zero crossing synchronous switching power circuit suitable for use with resistive loads or other loads having unity power factor.

The zero crossing synchronous switching alternating current power circuit shown in FIGURE 1 is comprised by a power semiconductor gate controlled bi-directional conducting device 11 connected in series circuit relationship with a load 12 (such as a heating element) across a pair of power supply terminals 13 and 14. Power supply terminals 13 and 14 are designed so that they can be easily connected across a conventional 50–60 cycle, 120 or 240 volt alternating current power source by means of a standard commercial electric cord or the like. The gate controlled bi-directional conducting device 11 preferably comprises a triac, a gated biswitch, a quadrac, a symistor, or some other similar gate controlled conducting device. The triac is a commercially available gate controlled bi-directional conducting semiconductor switch manufactured and sold by the semiconductor products Department of the General Electric Company located in Syracuse, New York. For a description of the triac, reference is made to Application Note 200.35, issued February 1964 entitled, "Triac Control for AC Power," by E. K. Howell, published by the Semiconductor Products Department of the General Electric Company, located in Syracuse, N.Y. See also the article entitled, "Bilateral SCR Lets Designers Economize on Circuitry," appearing on the Jan. 20, 1964, issue of Electronic Design magazine. The quadrac is a bilateral switching device having many characteristics similar to the triac, as is the symistor which is a device manufactured and sold in France. While a more detailed description of the characteristics of a triac etc., can be obtained from the above referenced articles, the following description is thought to be adequate for the purpose of this disclosure.

The triac can conduct current in either of two directions depending upon the polarity of the potential across its load terminals. Accordingly, if the potential of supply terminal 14 is positive with respect to the terminal 13, triac 11 will conduct current in the direction from terminal 14 to terminal 13. If on the other hand, the potential of terminal 13 is positive with respect to the potential of terminal 14, triac 11 will conduct current in the direction from terminal 13 to terminal 14. The bi-directional conducting triac 11 can be triggered into a conducting state by a low voltage signal level gating signal applied to its control gate element shown at 15. Once it is triggered into conduction, the triac remains conducting until the current flowing through the device is reduced below a known minimum holding current value. This is known as its latching characteristics since it is similar in effect to the latching characteristic of a latching relay. The triac is turned off automatically by the alternating current passing through the zero value region. In this region the current through the triac drops below the minimum holding value so that the device automatically turns off.

In order to reduce radio frequency interference effects, the triac 11 is turned on by a low voltage zero crossing synchronously operably control circuit 16 connected to its control gate 15. The construction and operation of a suitable synchronously operable control circuit for use in controlling power supplied to both unity power factor and non-unity power factor loads will be described more fully hereinafter in connection with FIGURES 4 through 8 of the drawings. With these circuits, load current flow through the load 12 can be controlled.

While it is intended that the new and improved zero crossing synchronous switching power circuits for use with unity power factor and non-unity power factor loads, and the synchronously operable control circuit therefor, are to be used normally with an alternating current supply potential connected across the power supply terminals 13 and 14, as illustrated in FIGURE 1, the circuit could be used with a full wave or half wave rectified supply potential applied across these terminals. With such a supply potential, the gating signal developed by the synchronously operable control circuit 16 will function to gate on the triac 11 to cause it to conduct load current through the load 12 substantially in only one direction. Thus it would be possible to substitute a unidirectional conducting device such as a conventional SCR shown at 17 to right of the triac 11 in place of triac 11. This could be accomplished by merely connecting the points *a* to *b* to correspondingly marked points *a* and *b* in the circuit of FIGURE 1. However, such arrangement would only be used when the supply potential previously has been either half wave or full wave rectified.

Figure 2:
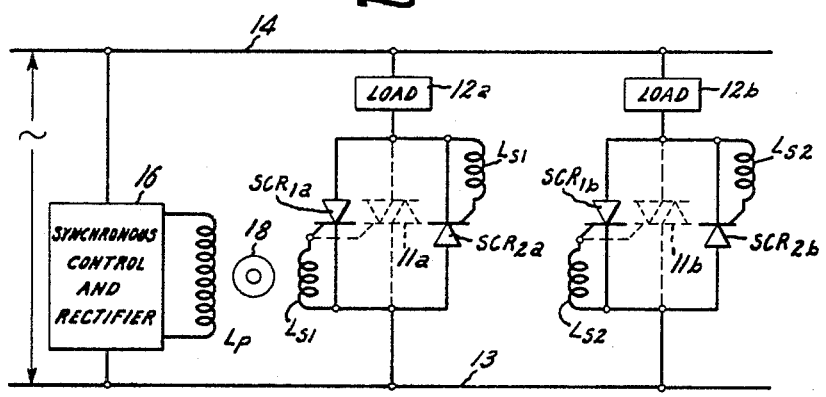
FIGURE 2 is a functional block diagram of a variation of the circuit of FIGURE 1, and illustrates this same using conventional SCR's connected in back to back reverse polarity relationship for controlling load current through the load.

FIGURE 2 of the drawings illustrates another form of the invention, and helps to define more clearly the term bi-directional conducting device. In FIGURE 2 the synchronously operable control 16 is shown connected across the power supply terminals 13 and 14 which have a conventional alternating current supply potential applied thereto. The gating signal developed by the synchronously operable control 16 is applied across the primary winding $L_p$ of a gating transformer. The primary winding $L_p$ of the gating transformer is inductively coupled through a core shown at 18 to a plurality of secondary windings $L_{s1}$ and $L_{s2}$ which are in turn operatively coupled to the control gate of respective associated gate controlled bi-directional load current carrying conducting devices which may comprise triacs 11a and 11b, respectively, shown in dotted outline form. These devices are connected in series circuit relationship with an associated load $12_a$ or $12_b$ respectively, across the power supply terminals 13 and 14. It is also possible for the gate controlled bi-directional conducting devices to comprise a pair of back-to-back, reverse polarity connected conventional SCR's such as $SCR_{1a}$ and $SCR_{2a}$. By connection in this manner, the gating pulses will be applied to the gating electrodes of both of the back-to-back connected $SCR_{1a}$ and $SCR_{2a}$ concurrently. However, since only one of these SCR's will be enabled by the supply potential to conduct load current, that is the SCR which will be fired by the gating pulse. The circuit of FIGURE 2 is intended merely to illustrate that back-to-back reverse polarity connected SCR's can be readily substituted for triacs (which are the preferred form of bi-directional conducting devices to be used in the instant invention) where for example available current rating of triacs are not adequate to handle the load currents envisioned. Another way to handle the problem of inadequate current ratings would be to connect several triacs in parallel and gate them on simultaneously as depicted by the triacs $11_a$ and $11_b$ shown in dotted outline form in FIGURE 2.

Figure 3:
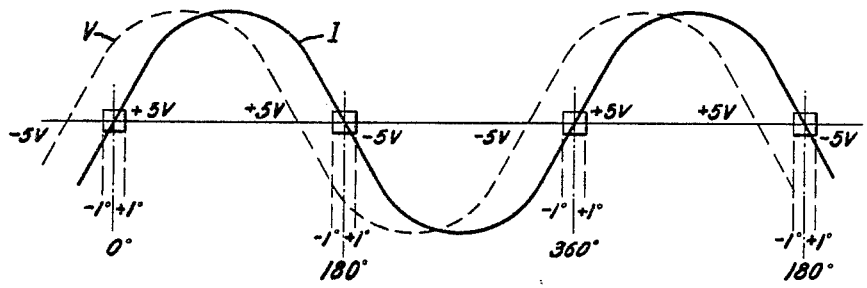
FIGURE 3 is a characteristic wave shape showing voltage and current amplitude versus time for an inductive non-unity power factor load and serves to illustrate the manner of operation of a zero crossing synchronous switching power circuit for such loads.

Referring now to FIGURE 3 of the drawings, the current versus time characteristic of a conventional 60 cycle, 120 volt alternating current supplying an inductive load, is illustrated. It can be appreciated that between the zero value regions of each alternating half cycle, there is a considerable current value I that could flow in the circuit if it is assumed that the triac 11 is turned on and conducting during such intervals. However, during the zero crossing intervals, which for convenience of illustration will be defined to be between about $+$ or $-1$ degree of the zero crossing points at zero degrees, 180°, 360°, 540°, or 180°, etc., the current value drops below the minimum holding current value required to maintain such power semiconductor devices in a conducting condition. It should be noted, however, that the invention is not restricted so as to operate within the values cited above, for they may be different for a different assumed load. It should be noted that this region is also bounded by voltage values of about plus or minus five (5) volts across the triac 11 (while it is in its blocking non-conducting condition). The voltage characteristic across the load which will either lead or lag the current curve depending upon the nature of the load being supplied, is shown in dotted lines. It might also be noted that the zero value region does not have to be symmetrical as illustrated in FIGURE 3 for convenience, but by appropriate phase shift techniques, it would be possible to employ only a certain region, for example, that immediately following the zero crossing. From a consideration of FIGURE 3, however, it can be appreciated that the term "zero crossing" used hereinafter is intended to depict essentially the condition wherein the current through the load is in that region of FIGURE 3 shown by the squares wherein its value is substantially reduced and is in the neighborhood of zero. Switching on and off of a power semiconductor at this point in the load current introduces no large sharp transients in the current being supplied to the load, and hence results in minimizing undesired radio frequency interference effects which otherwise might be produced if the power controlling semiconductor were switched on and off at other points in the supply cycle.

Figure 4:
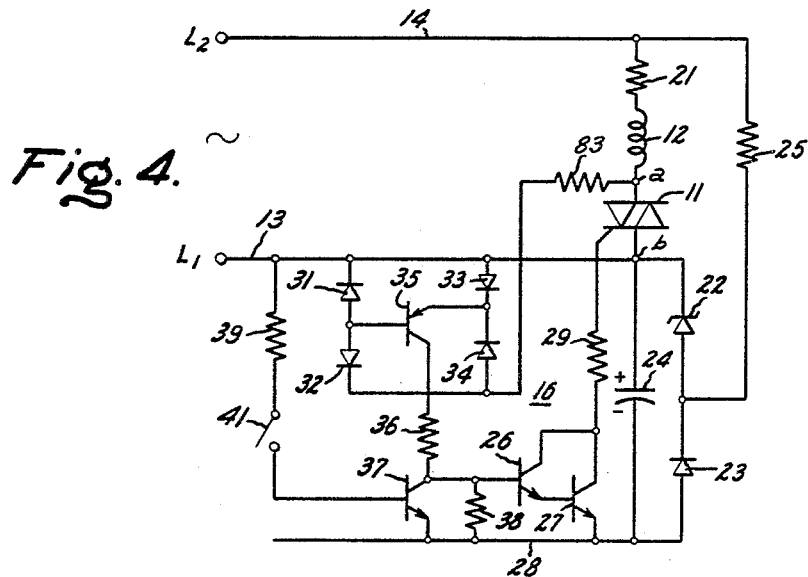
FIGURE 4 is a schematic circuit diagram of a new and improved zero crossing synchronous switching power circuit for use with either unity power factor or non-unity power factor loads.

FIGURE 4 of the drawings illustrates one embodiment of a new and improved zero crossing synchronous switching circuit for power semiconductors supplying either unity power factor or non-unity power factor loads constructed in accordance with the invention. The circuit shown in FIGURE 4 is comprised by a triac power semiconductor load current carrying gate controlled conducting device 11 connected in series circuit relationship with a non-unity power factor load comprised by the winding 12 having a finite amount of resistance indicated at 21. The series circuit thus comprised is connected across a pair of power supply terminals 13 and 14 which in turn are connected to a conventional 60 cycle 120–240 volt alternating current power supply. As was briefly explained in connection with FIGURE 1 of the drawings, the triac 11 is turned on and off for a desired number of integral half cycles of the supply alternating current potential by synchronously operable control circuit means 16. From an examination of FIGURE 3 it will be seen that if the triac 11 is turned on at an appropriate point during the zero crossing interval, it will then conduct through the remaining half cycle until the current again passes through the zero value region causing it to be turned off. If in the following half cycle, triac 11 is again gated on by the synchronously operable control circuit 16, it will then again conduct during the next successive half cycle. Thus, by controlling the number of integral half cycles which the triac 11 is allowed to conduct, current through the load 12 can be proportionally controlled. Since turn on and turn off of the triac 11 is achieved during the current zeros of the alternating current supply, no sharp switching transients are introduced into the supply thereby reducing any radio interference effects to an absolute minimum. As a consequence no substantial filtering elements are required in the circuit thereby simplifying its construction. It might also be noted that by reason of its bi-directional conducting characteristic the triac 11 can conduct current in either direction through the load. Thus, upon the terminal 14 going positive with respect to the supply terminal 13 as, for example, during the interval of the supply current extending from 0° to 180° shown in FIGURE 3, if the triac 11 is gated on it will conduct current from terminal 14 to terminal 13. During the next successive half cycle the interval from 180° to 360°, the terminal 13 will be positive with respect to the terminal 14 and, as a consequence, if the triac 11 is gated on, it will conduct current from terminal 13 to terminal 14.

The synchronously operable control circuit means 16 for use with the power circuit shown in FIGURE 4 is comprised by a means operatively coupled to the triac 11 for providing a continuous low voltage gating potential. This means is comprised by a Zener diode 22 and a diode rectifier 23 connected across a filter capacitor 24. One terminal of capacitor 24 and the cathode of Zener diode 22 are connected in a common to power supply line 13, the remaining terminal of capacitor 24 is connected to the anode of diode rectifier 23 and the low voltage direct current gating potential terminal 28, and the midtap point of Zener diode 22 and diode rectifier 23 is connected through a 10 kilo-ohm resistor 25 to power supply terminal 14. As a consequence of this arrangement, the diode rectifier 23 functions to develop a low voltage (in the neighborhood of about 8 volts) unidirectional gating potential across the filter capacitor 24 and terminal 28 which has the polarities indicated wherein the terminal of the capacitor connected to power supply line 13 is positive. Zener diode 22 operates to clamp the voltage across terminal 28 to the desired value.

The synchronously operable control circuit means 16 is further comprised by gating means formed by a pair of npn junction transistors 26 and 27 which are connected as conventional feedback coupled amplifiers wherein the collector of the transistor 27 is connected to the collector of the transistor 26 and the emitter of the transistor 26 is connected to the base of the transistor 27. The emitter of the transistor 27 is connected to terminal 28 which comprises the negative terminal of the low voltage gating potential source comprised by the filter capacitor 24. The common collectors of the transistors 26 and 27 are connected through a limiting resistor 29 to the control gate of triac 11. By this arrangement, the gating means comprised by transistors 26 and 27 is operatively coupled through the control gate-emitter of triac 11 to the filter capacitor 24, and when turned on, serves to apply a gating on signal to the triac 11 to cause the same to conduct load current through load 12.

The synchronously operable circuit means 16 is further comprised by sensing and turn on signal producing means formed by a diodes bridge including diode 31 through 34. One of the terminals of a set of opposed terminals (comprised by the cathode of diode 31 and the anode of diode 33) is connected to the power supply terminal 13. The other one of the same set of opposed terminals (comprised by the cathode of diode 32 and the anode of diode 34) is connected through a 10 kilo-ohm limiting resistor 83 to one of the load terminals of triac 11. Turn on signal deriving means are operatively coupled across the remaining set of opposed terminals of the diode bridge for deriving a turn-on signal for application to the gating means comprised by transistors 26 and 27. This turn-on signal deriving means comprises a pnp junction transistor 35 having its emitter connected to the juncture of the collectors of diodes 33 and 34 and having its base connected to the juncture of the emitters of diodes 31 and 32. The collector of transistor 35 is connected through a limiting resistor 36 to the base of the transistor 26 comprising a part of the gating means. By this means turn-on signals are applied to the base of transistor 26 to cause the two transistors 26 and 27 to gate on the triac 11.

The synchronously operable control circuit means 16 is further comprised by shunt means operatively coupled to the gating transistor 26 for shunting the gating signals to this transistor, and control means are operatively coupled to the shunt means for controlling operation of the shunt means. The shunt means is comprised by an npn junction transistor 37 having its collector connected between the juncture of the limiting resistor 36 and the base of transistor 26 comprising part of the gating means for triac 11. The circuit is completed by 56 kilohm bias resistor 38 connected between the base of transistor 26 and the negative terminal 28 of the source of continuous low voltage gating potential and the emitter of junction transistor 27 connected to the terminal 28 of the source of low voltage continuous gating potential.

The base of transistor 37 is connected to a source of control signals for controlling operation of the transistor 37 and hence controlling the shunting action that it has on the turn-on signals to be applied to the base of transistor 26. In the embodiment of the invention shown in FIGURE 4 this source of control signals comprises a 500 kilohm dropping resistor 39 connected through an on-off switch 41 to the base of transistor 37. Upon the switch 41 being closed, a positive potential will be applied to the base of transistor 37 which causes this transistor to turn on. Upon the transistor 37 being turned on, turn on signals derived by transistor 35 will be shunted away from the base of transistor 26 so that the feedback connected transistors 26 and 27 are not turned on. As a consequence no gating-on signal will be applied to the triac 11 and it will remain in its blocking non-conducting condition through the succeeding half cycle of supply current.

The operation of the FIGURE 4 circuit is as follows. Assume for the sake of this descrption that the current through the load 12 is such that the terminal 14 is just passing through zero going from negative to positive polarity. Due to the non-unity power factor nature of the load 12, the current through triac 11 will be lagging the voltage by some predetermined phase angle as illustrated in FIGURE 3 of the drawings. Thus, as the current through triac 11 goes through zero, triac 11 will assume a blocking non-conducting condition. As triac 11 starts to block, the voltage across the device will start to rise instantaneously due to the fact that the voltage leads the current through the circuit by the predetermined phase angle. This sharp rise in voltage is supplied through the sensing and turn-on signal deriving means comprised by the diode bridge 31 through 34 and transistor 35. It will be seen that the diode bridge 31 through 34 is in effect coupled across the triac 11 so that it measures the rise in voltage as the triac starts to block. The turn-on signal derived by the transistor 35 is then supplied to the base of transistor 26 in the gating means. Application of this turn-on signal then causes the two feedback connected transistors 26 and 27 to go full on applying a gating on potential to the triac 11 so that it is then rendered conductive.

The above description is true assuming that the shunting means comprised by transistor 37 is not turned on. However, should the switch 41 be closed so as to apply a positive turn-on potential to the transistor 37, it will be rendered conductive, and will shunt the turn-on signal supplied from transistor 35 away from the base of transistor 26. As a consequence the gating means comprised by the pair of transistors 26 and 27 will not be triggered on, and hence will not gate on the triac 11. The triac 11 therefore remains in its blocking non-conducting condition throughout the remainder of the half cycle until such time that the same process is repeated on the successive negative half going cycle. It should be noted that while the control means shown in FIGURE 4 comprises a switch 41 connected through a limiting resistor 39 to a source of positive gating potential, this control means could in fact comprise any source of control current such as that supplied, for example, by temperatures sensing resistor, optical sensors, pressure sensitive elements, etc., for controlling operation of the shunting transistor 37.

Figure 5:
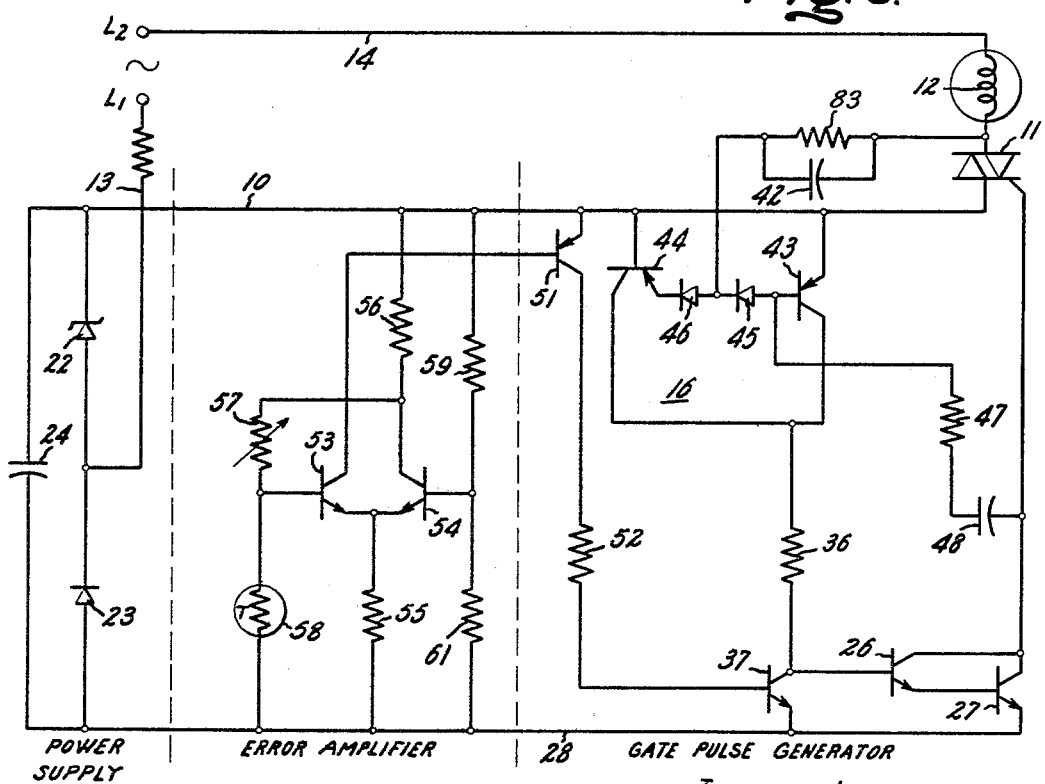
FIGURE 5 is a schematic circuit diagram of a modified form of the circuit shown in FIGURE 4.

FIGURE 5 shows an improved form of the circuit illustrated in FIGURE 4 and functions in a similar manner. For this reason like parts of the circuit shown in FIGURE 5 have been given the same reference numeral as the corresponding part in the circuit shown in FIGURE 4. The FIGURE 5 circuit differs from the FIGURE 4 circuit, however, by the provision of certain additional features. One of these additional features is comprised by a capacitor 42 which is connected in parallel across the 10 kilohm limiting resistor 83 connected between the terminal of the triac 11 and the sensing and signal deriving circuit means 16. The inclusion of this capacitor 42 speeds up the turn-on process, and further serves to reduce the anode voltage spike normally appearing across the triac 11 upon turn on.

In addition to the above difference, the sensing and turn-on signal producing circuit means employed in the circuit of FIGURE 5 is different from the diode bridge arrangement used in FIGURE 4. In FIGURE 5 the sensing and turn-on signal producing means is comprised by a pair of turn-on pnp junction transistors 43 and 44. The turn-on transistor 43 has its emitter connected to the supply terminal 10, its collector connected through limiting resistor 36 to the base of gating transistor 26 and its base connected through a coupling diode 45 and resistor 83-capacitor 42 to the remaining load terminal of triac 11. Turn-on transistor 44 has its base connected to supply terminal 10, its collector connected through limiting resistor 36 to the base of gating transistor 26 and its emitter coupled through a coupling diode 46 and resistor 83-capacitor 42 to the said remaining load terminal of triac 11. By this arrangement upon the current through triac 11 going through the zero crossing region, it blocks, and the rise in voltage thereacross will be transmitted through either turn-on transistor 43 or 44 (depending upon the polarity of the supply current in the succeeding half cycle) to thereby turn-on gating transistor 26 and gate on triac 11. If supply terminal 10 is positive with respect to terminal 14, transistor 43 is turned on. If terminal 10 is negative with respect to 14, transistor 44 is turned on. Accordingly, it will be appreciated that during alternate half cycles, turn-on transistors 43 and 44 provide turn-on potentials to the base of gating transistor 26 unless they are shunted away.

The circuit arrangement of FIGURE 5 further differs from the FIGURE 4 circuit in that a feedback path is provided between the output of the gating means comprised by the pair of transistors 26 and 27 and the sensing and turn on signal producing circuit means 16. This feedback path is comprised by a resistor 47 and a capacitor 48 connected in series circuit relationship between the collectors of the gating transistors 26 and 27 and the juncture of the base of turn-on transistor 43 with coupling diode 45. The inclusion of the feedback resistor 47 and capacitor 48 in effect operates to convert the transistor 43 and the feedback connected transistors 26 and 27 into a one-shot multivibrator, and results in producing a better defined gate pulse of known time duration for application to the control gate of the triac 11. This assures that a gating potential will be applied to the control gate of triac 11 for a sufficiently long period to assure turn-on of triac 11 through the zero crossing interval despite changes of direction of current flow through the load, etc., which otherwise might adversely affect turn-on of the triac in the right direction. It also results in limiting the maximum anode voltage of triac 11 during turn-on to approximately a desired 5 volt value thereby minimizing any radio frequency interference effects to the greatest possible extent. In other respects, the synchronously operable control circuit shown in FIGURE 5 is similar in construction and operates similarly to the FIGURE 4 circuit, and hence need not be described in further detail.

The circuit shown in FIGURE 5 does, however, illustrate the detailed construction of a preferred form of control means which is operatively coupled to the shunt means comprised by transistor 37 for controlling operation of the shunting action of this transistor. In the FIGURE 5 circuit, this control means includes a pnp junction transistor 51 having its emitter connected to one of the terminals 10 of the source of continuous low voltage gating potential appearing across the filter capacitor 24, and having its collector connected through a 10 kilohm limiting resistor 52 to the base of transistor 37 in the shunting means. The base of transistor 51 in turn is connected to the collector of an npn junction transistor 53 which in conjunction with a second npn junction transistor 54 comprises a differential amplifier. This differential amplifier further includes a common emitter resistor 55 connected in common to the emitters of both transistors 53 and 54 and a load resistor 56 connected to the collector of the transistor 54. The collector of transistor 54 is also connected through a feedback resistor 57 to the base of transistor 53 with the base of transistor 53 also being connected through a temperature sensitive thermistor 58 to the negative terminal 28 of the source of continuous low voltage gating potential comprised by filter capacitor 24. The base of the junction transistor 54 is connected to a voltage divider comprised by a pair of voltage dividing resistors 59 and 61 connected in series circuit relationship between the terminals 10 and 28 of the source of continuous low voltage gating potential.

With this arrangement, by proper adjustment of the value of the reference resistor 57 the temperature at which the bias applied to the base of transistor 53 through the biasing circuit comprised by thermistor 58, feedback resistor 57 and load resistor 56 and the common emitter resistor 55, causes the transistor 53 to be rendered conductive, can be controlled. If it is assumed that the thermistor 58 has a negative temperature coefficient for temperature control of a refrigerator, a fan or air conditioning installation, for example, then the bias developed across thermistor 58 can determine the turn-on point of transistor 53. Ordinarily, where the temperature of the space being controlled is not down to temperature, the transistor 54 will be biased into conduction by 59, 61 and the bias developed across the common emitter resistor 55, and will remain in this condition for so long as the temperature of the space being controlled remains above the preset level set on the reference resistor 57. However, as the temperature decreases, the resistance of the thermistor 58 rises due to its negative temperature coefficient, so as to bias the base of transistor 53 sufficiently positive to render it conductive. Upon turn-on of the transistor 53 the base of the pnp transistor 51 will be driven sufficiently negative to cause this transistor to turn on and apply a turn-on signal to the base of the shunt transistor 37. Turn on of the shunt transistor 37 shunts away the turn-on signal from the base of the transistor 26 and thereby prevents triac 11 from being gated-on for so long as the desired low temperature conditions prevails. If it is further assumed that load 12 is the start and run windings of a compressor motor for a refrigerator, fan, air conditioner compressor, etc., then it will be appreciated that by preventing triac 11 from being gated on, the compressor cannot run, and further lowering of the temperature of the space being temperature controlled, is prevented.

As the temperature in the space being controlled rises, it will reach a point where the bias applied to the base of transistor 53 by thermistor 58 becomes sufficiently negative to cause transistor 53 to commence to turn off. As this occurs, the bias applied to transistor 54 due to resistor 55 becomes such that transistor 54 turns on. Upon turn-on of transistor 54, its collector goes negative, and this negative-going voltage is fed back through resistor 57 to drive transistor 53 fully into cut-off. It might be noted that by appropriate adjustment of the values of the bias resistors, particularly the value of the feedback resistor 57, the temperature value at which transistor 53 switches off and transistor 54 switches on, can be made different from the temperature value at which the transistor 53 switches on and the transistor 54 switches off. Thus, it can be seen that by appropriate adjustment of the parameters of the circuit, the circuit can be made to exhibit hysteresis effects which are desirable in the control of temperature controlled appliances, etc., as well as other applications of this control circuit. In other respects, the circuit of FIGURE 5 operates similarly to the circuit shown in FIGURE 4, and hence, it will not be described in further detail.

The circuit shown in FIGURE 5 of the drawings is a workable circuit; however, its performance can be marginal during initial start up while the filter capacitor 24 is being charged. During the interval, if it occurs that the gating means comprised by the pair of transistors 26 and 27 is turned on, but there is not yet enough energy stored in the filter capacitor 24 to gate on the triac 11, the charging current to the capacitor 24 will be diverted through the transistors 26 and 27. As a consequence, the capacitor 24 may never charge sufficiently to fire the triac 11 and the circuit could not start. There are several solutions to this problem which may be practical in different applications. One of the solutions is to increase the output capability of the direct current power supply comprised by rectifiers 22 and 23 and filter capacitor 24. This can be done, for example, by reducing the value of the resistance in the terminal lead 13 so that the filter capacitor 24 can be charged adequately to assure circuit operation. Another solution to the problem would be to insert to Zener diode in series with the collector of the turn-on signal deriving transistor 35. Insertion of such a Zener diode having an appropriate value would then permit the filter capacitor 24 to be charged sufficiently prior to the gating means comprised by the transistor pair 26 and 27 being turned on. Other modifications to the circuit to overcome this problem are also available.

Figure 6:
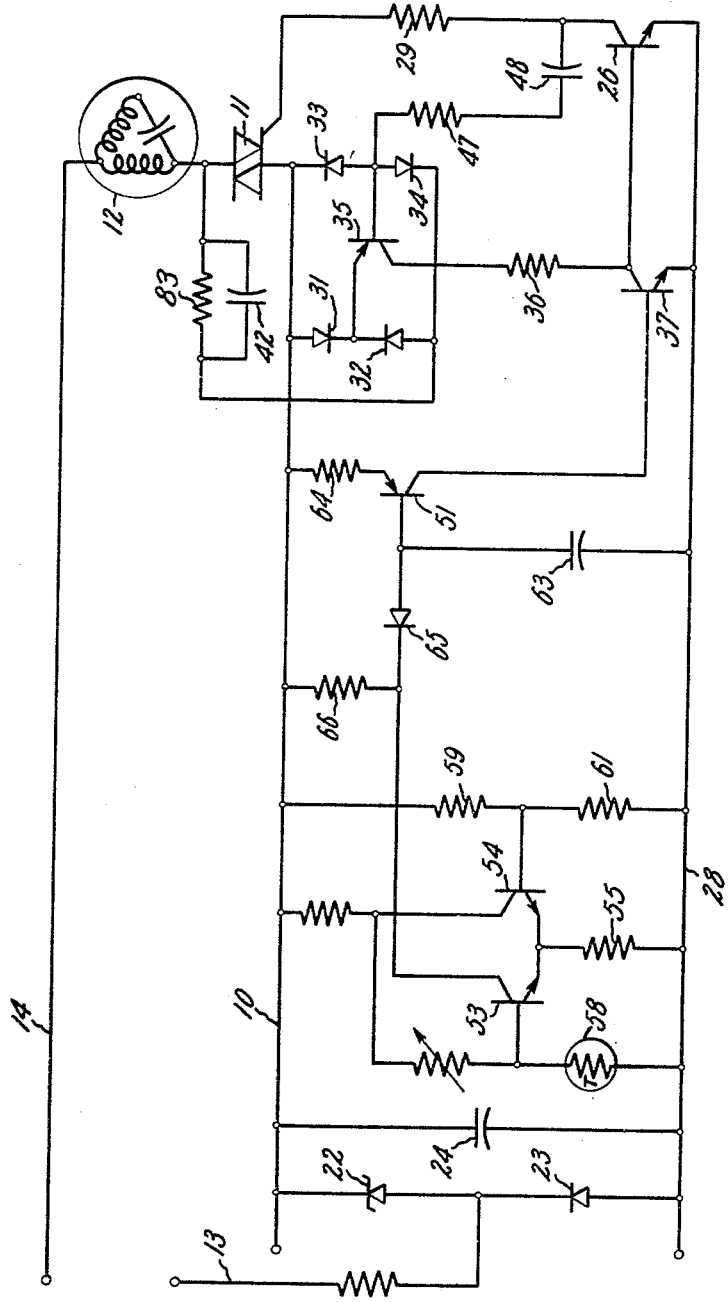
FIGURE 6 is a schematic circuit diagram of still another variation of the circuit shown in FIGURE 4.

The above-mentioned problem can also be overcome with the embodiment of the invention shown in FIGURE 6 of the drawings. The FIGURE 6 circuit is similar in many respects to the circuit shown in FIGURES 4 and 5 and operates in the same manner with certain exceptions to be described hereinafter. In the FIGURE 6 circuit, the base of the pnp junction transistor 51 comprising a part of the control means of the circuit has a capacitor 63 connected thereto. In addition, a resistor 64 is connected between the emitter of the pnp junction transistor 51 and terminal 10 of the continuous low voltage gating potential source. The base of the transistor 51 is connected back to the collector of the transistor 53 in the differential amplifier portion of the temperature-sensing network through a diode 65, and the cathode of the diode 65 is connected through a second resistor 66 to the terminal 10 of the low voltage power supply. The time constant of the resistor 64 and the capacitor 63 is designed such that it is longer than the charging time constant of the filter capacitor 24. By this arrangement, the capacitor 63 is charged at a sufficiently slow rate to maintain the transistor 51 turned on during start-up of the circuit. As a consequence, transistor 51 will be conductive during start up of the circuit so as to turn on the shunt transistor 37, and prevents the application of any turn-on signals to the gating transistor 26. In this manner, the gating-on circuit means is locked out until the power supply capacitor 24 is charged sufficiently for the circuit to operate properly. Upon the capacitor 24 being charged, and subsequent thereto upon the capacitor 63 reaching its fully charged potential, the transistor 51 will be biased off (assuming that the temperature of sensing thermistor 58 or other suitable control device is above the present level). Upon turn-off of the transistor 51, shunt transistor 37 will be turned off so that the circuit can then commence to operate in accordance with the turn-on signals derived by the diode bridge 31 through 34 and transistor 35 as previously explained. Since the operation of the circuit from this point on would be entirely similar to the operation of the circuits shown in FIGURES 4 and 5, a further description thereof is believed unnecessary.

In addition to the above, it should be noted that the load 12 in the FIGURE 6 circuit comprises a capacitor-start motor. Such motors can exhibit capacitive reactance characteristics under certain circumstances (i.e., during starting, etc.). When used with such loads, the zero-crossing synchronous switching circuits operate substantantially as described hereinbefore. However, with such loads reversal of the voltage across the triac 11 at the current zero requires that the turn-on current pulse supplied by gating means 26 be sufficiently long in duration to assure complete turn-on of the circuit. This can be accomplished readily by proper adjustment of the values of the feedback resistor 47 and capacitor 48.

The problem of inadequate charging of the filter capacitor in the low voltage gating signal source, can also be corrected with the circuit shown in FIGURE 7 of the drawings. The circuit shown in FIGURE 7 is a preferred embodiment of the invention and is somewhat similar in many respects to the circuit shown in FIGURES 4 through 6. The circuit of FIGURE 7 differs from the previous circuits, however, in the construction of the gating means and the shunt means both comprising a part of the synchronously operable control means 16.

In the FIGURE 7 circuit the gating means is comprised by a single npn junction transistor 26 connected through resistor 29 to the control gate of triac 11. The transistor 26 has its base connected to the emitter electrode of a transistor 71 which is connected in positive feedback relation with a second transistor 72. For this purpose the transistor 71 has its collector electrode connected back to the base of the transistor 72, and the collector of the transistor 72 is connected back to the base of transistor 71. The base of transistor 72 is also connected between a pair of voltage dividing resistors 73 and 74 which are connected in series-circuit relationship with the emitter-collector of a second gating transistor 75. The base of the second gating transistor 75 is connected back through the limiting resistor 36 to the collector of turn-on signal deriving transistor 35 in the sensing and turn-on signal deriving means. The emitter of transistor 72 is connected to a charging network comprised by a capacitor 76 connected in series-circuit relationship with a resistor 77, a diode 78 and a second resistor 79, the series circuit thus comprised being connected between the two terminals 13 and 28 of the source of low voltage gating potential comprised by the charging capacitor 24.

The juncture of diode 78 and resistor 79 is connected through a diverting diode 81 to the collector of gating transistor 26. This juncture is also connected through a coupling diode 82 to the collector electrodes of a plurality of transistors 53A, 53B, 53C, etc., comprising a part of the differential amplifier comprised by the transistors 53 and transistors 54. It will be noted that the transistor 53A has its base connected between the juncture of a reference resistor 58A and a temperature-sensitive thermistor 83A connected in series-circuit relationship between the terminals 13 and 28 to the source of low voltage gating potential. The base of transistor 53A is also coupled back through a feedback resistor 57A to the juncture of resistor 56 with the collector of transistor 54. Thus, this circuit connection is very similar to the temperature-sensing differential amplifier arrangement described with relation to FIGURE 5 of the drawings and functions in a similar manner. It should be noted, however, that additional transistors 53B, 53C, etc., are added in parallel with the transistor 53A to provide additional control functions for the circuit. By this arrangement, a plurality of temperature sensors, such as overheat sensors 83A, 83B and 83C thermally coupled to the windings of the motor 12 can be supplied to the base of the transistors 53A, 53B and 53C, respectively. Any one of these sensors could, for example, take over control of the circuit so as to maintain the triac 11 tuned off and non-conducting for so long a period as any one of these phase motor windings are overheated, etc. Additional types of override control such as a pilot contactor could also be provided and, by appropriate connection to one of the additional transistors 53A, 53B, etc., could take over operation of the circuit.

With the circuit arrangement shown in FIGURE 7, the transistors 71 and 72 are interconnected in a positive feedback manner such that when the transistor 72 is turned on, both transistors are driven into saturation, and hence the voltage drop between their emitters is extremely low. These two transistors in conjunction with the capacitor 76 form in effect a relaxation oscillator. In operation, during normal conduction of the triac 11, the transistors 35 and 75 are maintained off due to the fact that there is a low voltage drop across the triac 11. As a consequence the voltage applied to the base of the transistor 72 will be substantially that of the positive terminal 13 of the low voltage gating potential source. Since transistors 72 is a pnp transistor, this maintains transistor 72 turned off and capacitor 76 is allowed to charge through the resistor 79, diode 78 and resistor 77 to essentially the full potential of the positive terminal 13. Upon the current through triac 11 reaching zero, a voltage will be developed across the load terminals of the triac due to its returning to the blocking non-conducting condition. This voltage causes the transistors 35 and 75 to be rendered conductive, and results in applying a turn-on potential to the base of the transistor 72. Turn-on of transistor 72 also causes turn-on of transistor 71 due to their feedback connection and results in discharging capacitor 76 into the base of gating transistor 26, causing it to turn on. Conduction of gating transistor 26 results in applying a gating-on signal to the gate electrode of triac 11, thereby again rendering it conductive for the ensuing half cycle of the supply alternating current potential applied across terminals 13 and 14. It might also be noted that conduction through the transistor 26 also diverts current through the diode 81 which results in allowing the transistors 72 and 71 to be turned off, and allows capacitor 76 to be recharged.

During the initial start-up period while the filter capacitor 24 is being charged, there will be intervals where the triac 11 will be blocking voltage, and the transistors 35 and 75 will be rendered conductive. During such intervals, the combination of the two transistors 72 and 71 and charging capacitor 76 will operate as a relaxation oscillator. The time constant of the circuit is arranged such that this relaxation oscillator has a very low duty cycle. That is to say, the relaxation oscillator thus comprised has a low pulse width compared to the inter pulse time and as a result the average current through the gating transistor 26 will be so low that it does not prevent charging of the filter capacitor 24. Thus successful start-up of the circuit will be assured.

The above-set-forth description has thus far ignored the effect of the control signal being derived by the differential amplifiers 53A, 53B, 53C and 54. As previously stated, the transistors 53A, 53B, and 53C are connected to the temperature-sensing networks including thermistors 83A, 83B and 83C, respectively, for controlling operation of the circuit in accordance with the temperature being sensed by the temperature-sensitive resistors. Other types of signal sensors such as optical photocells, strain gauges, etc. could be used equally as well. In addition, further control functions can be supplied by the circuit by applying the control signals derived by any such additional sensors to the base electrodes of additional transistors similar to 53B, 53C, etc. Selected ones of these transistors then can be used to inhibit gate pulse generation by the circuit. With this arrangement, upon any one of the transistors 53A, 53B, 53C, etc., being turned on by its associated control signal, the voltage of capacitor 76 will be clamped through the diode 82 to a voltage level below the turn-on potential of the transistor 72. As a result, no gating-on pulses can be generated by the circuit. Hence, it can be seen that in this embodiment of the invention the transistors 53A, 53B, 53C, etc., in fact comprise the shunt means for shunting operation of the gating circuit means comprised in part by the capacitor 76.

Applications for the above-described circuit include the operation of refrigeration motors where normal control is derived from a thermistor sensing air temperature (as in the arrangement shown in FIGURE 5) and is over-ridden by a thermistor-sensing motor winding temperature, for example. Another type of application (shown in FIG. 7) would utilize three thermistor sensors thermally coupled to the windings of a three-phase motor with the triac controlling a three-phase motor contactor whose actuating winding 12 functions to close the normally open contacts that energize the windings. Input signals for controlling the inhibit transistors 53A, 53B, etc., can be derived from any type of sensor such as a thermistor, photocell, strain gauge, conducting fluid, etc. In addition, voltage signals referred to the base of the transistor 54 from other circuits can also be accepted to control operation of the circuit.

From an examination of the circuit shown in FIGURE 7 of the drawings, it will be seen that there are a number of terminal points marked $t_1$ through $t_{11}$. By breaking the circuit at these terminal points, the zero-crossing synchronously operable control circuit can be separated from the remainder of the power circuit, and may then be fabricated in integrated circuit form. FIGURE 8 of the drawings illustrates the resulting zero crossing synchronously operable control circuit arrangement. Since the circuit shown in FIGURE 8 is identical to the synchronously operable control circuit described with relation to FIGURE 7, a further description of its construction and operation is believed unnecessary. However, it should be noted that the elements embodied in the circuit shown in FIGURE 8 do not include transformers or inductances or capacitors having large capacitance values, and hence are all low power dissipation elements. Because of these characteristics, it is possible to fabricate the zero-crossing synchronously operable control circuit shown in FIGURE 8 in integrated circuit form. Since the construction techniques for the fabrication of integrated circuits are now well established, and such circuits are offered for sale to circuit designers by a number of integrated circuit manufacturers such as the Semiconductor Products Department of the General Electric Company, it is not believed necessary to describe in detail how the circuit shown in FIGURE 8 would be constructed in integrated circuit form. It is believed sufficient to point out that the entire circuit shown in FIGURE 8 can be placed on a single silicon or possibly germanium chip which is no more than a few milli-inches in length and breadth and something less than a few milli-inches in thickness. In fact, some 300 or more such circuits could be fabricated on a single silicon wafer one inch in diameter and less than a few mils thick. These circuits are manufactured by use of masking techniques well known in the photo-etching art, and hence can be mass-produced at very low cost for a given integrated circuit unit such as might be characterized by the circuit configuration shown in FIGURE 8. Additionally, by fabricating the circuits in this manner, they are integral units and their reliability is greatly improved. Hence, it can be appreciated that the circuit shown in FIGURE 8 can be fabricated in integrated circuit form, and hence can be embodied in a simple, single unit of extremely small size having very low cost and improved reliability. Because of its low cost, in the event that any part of the unit should fail in service, no trouble would be involved in pulling out the entire unit, discarding it and replacing it with a similar new replacement unit. Hence, the circuit when thus fabricated has greatly improved serviceability.

From the foregoing description, it can be appreciated that the present invention provides several new and improved zero-crossing synchronous switching power circuits for use with either unity power factor or non-unity power factor loads. By reason of the provision of these circuits, new and improved zero-crossing synchronously operable control circuits for use with such power circuits supplying either unity power factor or non-unity power factor loads are provided, and are designed in such a manner that they may be manufactured in integrated circuit form for reasons of cost advantage, size and reliability.

Having described several embodiments of new and improved zero-crossing synchronous switching power circuits for supplying either unity power factor or non-unity power factor loads constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A power control circuit including in combination at least one power semiconductor load current carrying gate controlled conducting device having a pair of load terminals connected in series circuit relationship with a load across a pair of power supply terminals, and synchronously operable control circuit means coupled to and controlling the gate controlled conducting device comprising means for providing a continuous low voltage gating potential, gating means operatively coupled to the means for providing the gating potential and operatively coupled to the control gate of said load current carrying gate controlled conducting device for applying a gating on signal to the device to cause the same to conduct load current therethrough, sensing and turn-on signal producing means operatively coupled to said load current carrying gate controlled conducting device and to said gating means for sensing a build up in potential across the load terminals of said gate controlled conducting device and supplying a turn-on signal to said gating means, shunt means operatively coupled to the gating means for shunting the gating means, and control means operatively coupled to said shunt means for controlling operation of said shunt means.

2. The power control circuit set forth in claim 1 wherein the load current carrying gate controlled conducting device comprises a triac bidirectional conducting semiconductor triode.

3. The power control circuit set forth in claim 1 wherein the load comprises a non-unity power factor load.

4. The power control circuit set forth in claim 1 wherein the sensing and turn-on signal producing means comprises a diode bridge having one set of opposite terminals operatively coupled across the load current carrying gate controlled conducting device for sensing a rise in potential across the device, and turn-on signal deriving means operatively coupled across the remaining set of opposed terminals of the diode bridge for deriving a turn-on signal for application to the gating means.

5. The power control circuit according to claim 4 wherein the turn-on signal deriving means comprises a p-n-p junction transistor having its base and emitter electrodes connected across the remaining set of opposed terminals of the diode bridge and having its collector electrode supply the derived turn-on signal to the gating means.

6. The power control circuit according to claim 4 wherein one of the terminals of the diode bridge is coupled to one of the terminals of the load current carrying gate controlled conducting device through a resistor capacitor coupling network.

7. The power control circuit set forth in claim 1 wherein a feedback connection is provided between the output of the gating means and the sensing and turn-on signal producing means for circuit stabilization purposes.

8. The power control circuit set forth in claim 1 wherein the load current carrying gate controlled conducting device comprises a triac bidirectional conducting semiconductor triode, the load comprises a non-unity power factor load formed by at least one electrical winding, the sensing and turn-on signal producing means comprises a diode bridge having one set of opposite terminals operatively coupled across the load current carrying gate controlled conducting device for sensing a rise in potential across the device, and turn-on signal deriving means operatively coupled across the remaining set of opposed terminals of the diode bridge for deriving a turn-on signal for application to the gating means, the turn-on signal deriving means comprising a p-n-p junction transistor having its base and emitter electrodes connected across the remaining set of opposed terminals of the diode bridge and having its collector electrode supply the derived turn-on signal to the gating means, and wherein one of the terminals of the diode bridge is coupled to one o fthe terminals of the load current carrying gate controlled conducting device through a resistor-capacitor coupling network.

9. The power control circuit set forth in claim 1 wherein said control means operatively coupled to and controlling said shunt means includes a charging-capacitor network for controlling actuation of said shunt means by said control means, said charging-capacitor network being operatively coupled to said means for providing a continuous low voltage gating potential and having a longer time constant than the charging time constant of said means for providing a continuous low voltage gating potential thereby assuring that the gating means is not actuated until the said means for providing a continuous low voltage gating potential is fully charged.

10. The power control circuit set forth in claim 1 wherein said gating means includes capacitor means operatively coupled to said means for providing a continuous low voltage gating potential, trigger means operatively coupled to the control gate of said gate controlled conducting device for controlling conduction therethrough, capacitor discharge means operatively coupled intermediate said capacitor means and said trigger means for controlling discharge of said capacitor into said trigger means to actuate the same, the capacitor discharge means and the capacitor means forming relaxation oscillator means, having a low duty cycle, and means for coupling the output from said sensing and turn-on signal producing means to said capacitor discharge means for actuating the same.

11. The power control circuit set forth in claim 10 wherein the shunt means serves to shunt the capacitor means.

12. The power control circuit set forth in claim 10 wherein unidirectional conducting means are interconnected between said capacitor means and said trigger means for diverting current from said capacitor discharge means upon the trigger means being actuated to allow the capacitor discharge means to recover its blocking condition.

13. The power control circuit set forth in claim 10 wherein the sensing and turn-on signal producing means comprises a diode bridge having one set of opposite terminals operatively coupled across the load current carrying gate controlled conducting device for sensing a rise in potential across the device, and turn-on signal deriving means operatively coupled across the remaining set of opposed terminals of the diode bridge for deriving a turn-on signal for application to the gating means.

14. The power control circuit according to claim 13 wherein the turn-on signal deriving means comprises a p-n-p junction transistor having its base and emitter electrodes connected across the remaining set of opposed terminals of the diode bridge and having its collector electrode supply the derived turn-on signal to the gating means.

15. The power control circuit according to claim 13 wherein one of the terminals of the diode bridge is coupled to one of the terminals of the load current carrying gate-controlled conducting device through a resistor-capacitor coupling network.

16. The power control circuit set forth in claim 1, wherein the load current carrying gate controlled conducting device comprises a triac bidirectional conducting semiconductor triode, the load comprises a non-unity power factor load formed by at least one electrical winding, the sensing and turn-on signal producing means comprises a diode bridge having one set of opposite terminals operatively coupled across the load current carrying gate controlled conducting device for sensing a rise in potential across the device, and turn-on signal deriving means operatively coupled across the remaining set of opposed terminals of the diode bridge for deriving a turn-on signal for application to the gating means, wherein the turn-on signal deriving means comprises a p-n-p junction transistor having its base and emitter electrodes connected across the remaining set of opposed terminals of the diode bridge and having its collector electrode supply the derived turn-on signal to the gating means, one of the terminals of the diode bridge being coupled to one of the terminals of the load current carrying gate controlled conducting device through a parallel resistor-capacitor coupling network, said gating means includes capacitor means operatively coupled to said means for providing a continuous low voltage gating potential, trigger means operatively coupled to the control gate of said gate controlled conducting device for controlling conduction therethrough, capacitor discharge means operatively coupled intermediate said capacitor means and said trigger means for controlling discharge of said capacitor into said trigger means to actuate the same, the capacitor discharge means and the capacitor means forming relaxation oscillator means having a low duty cycle, and means for coupling the output from said sensing and turn-on signal producing means to said capacitor discharge means for actuating the same, the shunt means serving to shunt the capacitor means, and unidirectional conducting means interconnected between said capacitor means and said trigger means for diverting current from said capacitor discharge means upon the trigger means being actuated to allow the capacitor discharge means to recover its blocking condition.

17

17. The power control circuit set forth in claim 1, wherein said control means includes differential amplifier means having bias means coupled thereto adjusted to exhibit hysteresis effects in the point of turn-on and the point of turn-off of the load current carrying gate-controlled conducting device.

18. The power control circuit set forth in claim 16 wherein said control means includes differential amplifier means having bias means coupled thereto adjusted to exhibit hysteresis effects in the point of turn-on and the point of turn-off of the load current carrying gate-controlled conducting device.

19. Synchronously operable control circuit means for controlling the operation of a gate-controlled conducting device synchronously with the current zero crossing intervals of an alternating current supply potential supplying a nonunity power factor load, and suitable for fabrication as an integrated circuit, comprising means for providing a continuous low voltage signal level gating potential, gating means operatively coupled to the means for providing the gating potential and adapted to be operatively coupled to the control gate of a gate-controlled conducting device for applying a gating-on signal to the device to cause the same to conduct load current therethrough, sensing and turn-on signal producing means adapted to be coupled to the gate-controlled conducting device and operatively coupled to said gating means for sensing build up in potential across the gate-controlled conducting device and supplying a turn-on signal to said gating means during the current zero crossing interval, shunt means operatively coupled to the gating means for shunting the gating means, and control means operatively coupled to said shunt means for controlling operation of said shunt means.

20. The power control circuit set forth in claim 19, wherein the sensing and turn-on signal producing means comprises a diode bridge having one set of opposite terminals operatively coupled across the load current carrying gate-controlled conducting device for sensing a rise in potential across the device, and turn-on signal deriving means operatively coupled across the remaining set of opposed terminals of the diode bridge for deriving a turn-on signal for application to the gating means.

21. The power control circuit according to claim 20, wherein the turn-on signal deriving means comprises a p-n-p junction transistor having its base and emitter electrodes connected across the remaining set of opposed terminals of the diode bridge and having its collector electrode supply the derived turn-on signal to the gating means.

22. The power control circuit set forth in claim 19, wherein said gating means includes capacitor means operatively coupled to said means for providing a continuous low voltage gating potential, trigger means operatively coupled to the control gate of said-controlled conducting device for controlling conduction therethrough, capacitor discharge means operatively coupled intermediate said capacitor means and said trigger means for controlling discharge of said capacitor into said trigger means to actuate the same, the capacitor discharge means and the capacitor means forming relaxation oscillator means, having a low duty cycle, and means for coupling the output from said sensing and turn-on signal producing means to said capacitor discharge means for actuating the same.

18

23. The power control circuit set forth in claim 21, wherein said gating means includes capacitor means operatively coupled to said means for providing a continuous low voltage gating potential, trigger means operatively coupled to the control gate of said gate-controlled conducting device for controlling conduction therethrough, capacitor discharge means operatively coupled intermediate said capacitor means and said trigger means for controlling discharge of said capacitor into said trigger means to actuate the same, the capacitor discharge means and the capacitor means forming relaxation oscillator means having a low duty cycle, and means for coupling the output from said sensing and turn-on signal producing means to said capacitor discharge means for actuating the same, the shunt means serving to shunt the capacitor means, and unidirectional conducting means interconnected between said capacitor means and said trigger means for diverting current from said capacitor discharge means upon the trigger means being actuated to allow the capacitor discharge means to recover its blocking condition.

24. The power control circuit set forth in claim 19, wherein said control means includes differential amplifier means having bias means coupled thereto adjusted to exhibit hysteresis effects in the point of turn-on and the point of turn-off of the load current carrying gate controlled conducting device.

25. A control system exhibiting substantially no undesired radio frequency interference effects including in combination a gate controlled conductivity controlled conducting device having a pair of load terminals connected in series circuit relationship with an electric load across a pair of power supply terminals adapted to be connected to an alternating current supply, synchronously operable control circuit means operatively coupled to said power supply terminals and to the control gate of said gate controlled conducting device for controlling conduction through the device synchronously with the zero crossing intervals of the supply alternating current, said synchronously operable control circuit means comprising sensing and control signal deriving means coupled across the load terminals of said gate controlled conducting device for controlling operation of said synchronously operable control circuit means.

26. The control system according to claim 25 wherein the electric load is a non-unity power factor load.

References Cited

UNITED STATES PATENTS

| 3,265,933 | 9/1966 | Perry et al. | |
|---|---|---|---|
| 3,329,887 | 7/1967 | Schaeve | 323—22 |
| 3,335,291 | 9/1967 | Gutzwiller | 307—252 |
| 3,358,218 | 12/1967 | Halpin | 323—22 |
| 3,363,143 | 1/1968 | Cavanaugh. | |

JOHN S. HEYMAN, Primary Examiner
B. P. DAVIS, Assistant Examiner

U.S. Cl. X.R.

307—305; 308—1; 323—22